United States Patent
Aihara et al.

(10) Patent No.: US 6,592,275 B1
(45) Date of Patent: Jul. 15, 2003

(54) IMAGE FORMING APPARATUS HAVING A FUNCTION OF SENDING OUTPUT COMPLETION NOTICE

(75) Inventors: Nobuhiro Aihara, Amagasaki (JP); Naoya Misawa, Kawasaki (JP); Toru Maegawa, Suita (JP)

(73) Assignee: Minolta Co., Ltd., Osaka (JP)

( * ) Notice: Subject to any disclaimer, the term of this patent is extended or adjusted under 35 U.S.C. 154(b) by 153 days.

(21) Appl. No.: 09/684,675

(22) Filed: Oct. 11, 2000

(30) Foreign Application Priority Data

Oct. 12, 1999 (JP) .............................. 11-290131
Oct. 21, 1999 (JP) .............................. 11-299960
Sep. 19, 2000 (JP) ............................ 2000-283918

(51) Int. Cl.⁷ .............................................. G06F 15/00
(52) U.S. Cl. ........................................ 400/62; 358/1.15
(58) Field of Search ................... 400/62; 340/172.5; 358/1.14, 1.15; 399/1

(56) References Cited

U.S. PATENT DOCUMENTS 3,839,708 A * 10/1974 Bredesen et al. ........ 340/172.5
5,815,764 A * 9/1998 Tomory ....................... 399/1
6,115,132 A * 9/2000 Nakatsuma et al. ....... 358/1.14
6,483,601 B1 * 11/2002 Yoneyama et al. ........ 358/1.15

FOREIGN PATENT DOCUMENTS

JP    11-194909    7/1999

* cited by examiner

*Primary Examiner*—Anh T.N. Vo
(74) *Attorney, Agent, or Firm*—Burns, Doane, Swecker & Mathis, LLP

(57) ABSTRACT

The printer having the mail-bin feature, at a time when the output for all the print jobs addressed to the same user, an output completion notice is transmitted to the particular user. When, in such a state that the previously discharged printed matter for a certain user (user D) still remains in any bin (bin 1), an attempt is made to process a print job for another user (user A) which designates the same bin as the discharge destination, an output completion notice is transmitted to the user (user D) the printed matter for whom still remains in the same bin before the print job is processed and the output completion notice is transmitted to the other user (user A).

18 Claims, 10 Drawing Sheets

| JOB | DESTINATION | FILE NAME |
|---|---|---|
| 1 | USER A | FILE 1 - 1 |
| 2 | USER A | FILE 1 - 2 |
| 3 | USER A | FILE 1 - 3 |
| 4 | USER A | FILE 2 - 1 |
| 5 | USER A | FILE 2 - 2 |
| 6 | USER B | FILE W |
| 7 | USER C | FILE X |
| 8 | USER C | FILE Y |

FIRST OUTPUT COMPLETION NOTICE

A print output for you has been completed .
At present , another print job for you is being accepted .

SECOND OUTPUT COMPLETION NOTICE

A print output for you has been completed .
At present , no other print job for you is found .

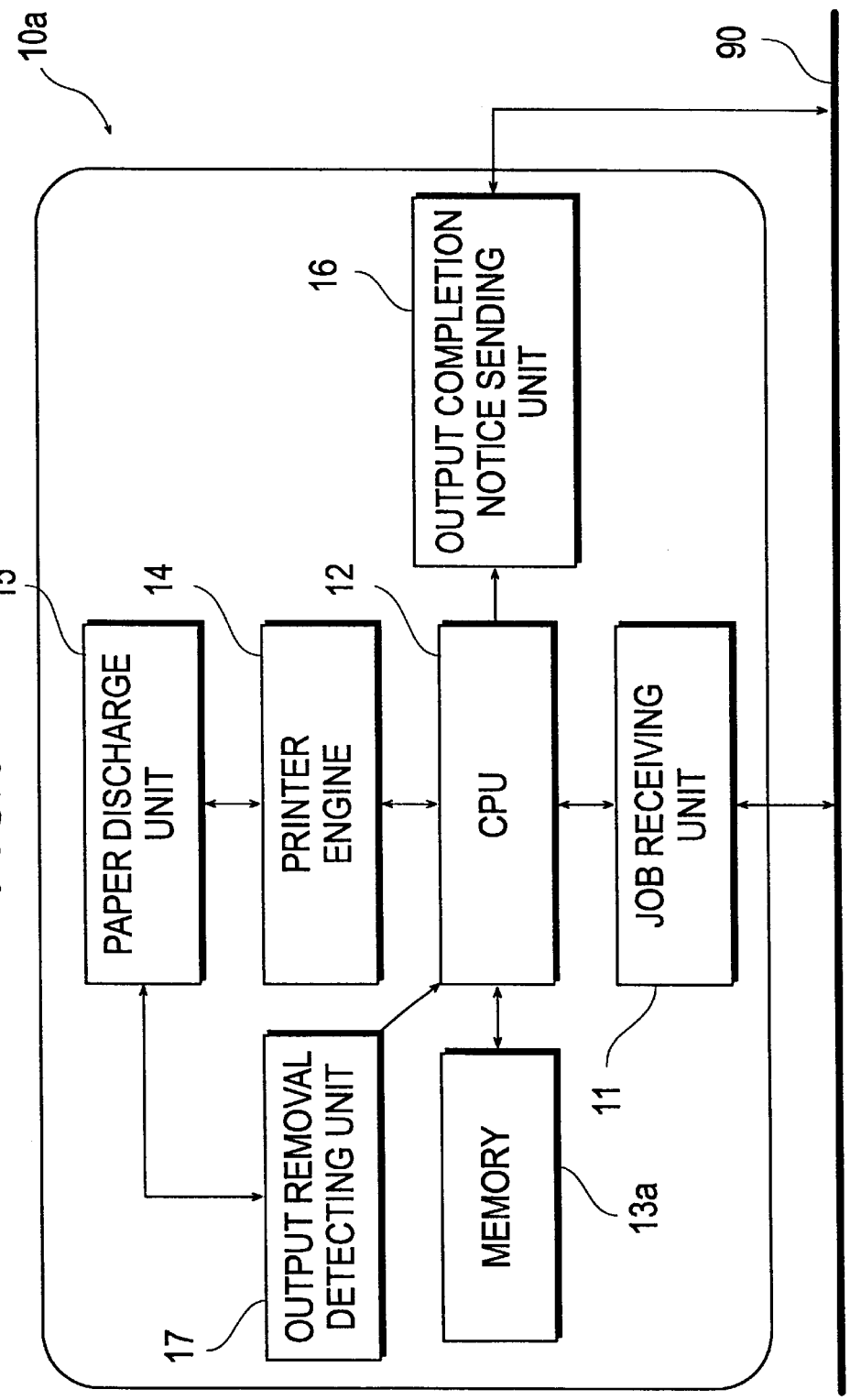

FIG.11

| BIN NO. | USER INFORMATION |
|---|---|
| 1 | USER A, USER D |
| 2 | |
| 3 | USER C, USER E |
| 4 | USER B |
| 5 | USER F |

FIG.13

| BIN NO. | USER INFORMATION |
|---|---|
| 1 | USER A |
| 2 | USER D |
| 3 | USER C, USER E |
| 4 | USER B |
| 5 | USER F |

IMAGE FORMING APPARATUS HAVING A FUNCTION OF SENDING OUTPUT COMPLETION NOTICE

This application is based on Japanese Patent Application No. 11-290131 filed on Oct. 12, 1999, Japanese Patent Application No. 11-299960 filed on Oct. 21, 1999, and Japanese Patent Application No. 2000-283918 filed on Sep. 19, 2000, the contents of which are hereby incorporated by reference.

BACKGROUND OF THE INVENTION

1. Field of the Invention

The present invention relates to an image forming apparatus having a function of sending output completion notices, a control method thereof, and a computer program product therefor.

2. Description of Related Art

As a conventional network printer system, a system which is disclosed in the official gazette of JP-A-11-194909 has been known.

This is a network printer system where multiple users share a printer by connecting the printer with multiple data processors (personal computers). In handling multiple successive print requests (print jobs) from the same data processor (the same user) in this system, the printer sends an output completion notice to the particular data processor (user) only once when the print output for all the print jobs is completed, thus avoiding the trouble of sending output completion notices successively and hence making user's input operation at the data processor more efficient. However, this official gazette does not describe nor suggest anything about the printer having the so-called mail-bin feature, and no related technology for such a printer has been found so far.

Here, in this specification, an "output completion notice" means a notice indicating that the output for a print job, which hereinafter includes both printing and paper discharging actions, is completed.

In recent years, in a printer equipped with a paper discharge unit which consists of multiple bins (places where printed matter is to be actually discharged), such an operating mode as to use the paper discharge unit as the so-called mail-bin has been implemented. Here, the use as mail-bin means, in general, the usage of assigning in advance each bin users who may use bins and making the use of each bin monopolized by the users whom each bin is assigned (mail-bin feature). In this case, when printing for a specific user is designated (mail-printing), the printer outputs only for the bin to which that user is assigned, so that each user sharing the printer can easily communicate with and make a report to specific users other than himself/herself by using the mail-bin feature.

In such a printer, it receives requests for the output to each bin not only from the users themselves whom each bin is assigned but also from other users, scanners, and facsimile machines on the network, so that the users whom each bin is assigned may often be unaware that there has been any outputs for themselves from other users and so on. Therefore, compared with printers without the mail-bin feature, the printer having the mail-bin feature has a higher need to prompt users to come and pick up printed matter by sending the output completion notices.

However, if the output completion notice were to be transmitted each time the output for a print job is completed, a stream of output completion notices, when multiple print jobs addressed to the same user exist, would be transmitted to the user. Accordingly, the stream of output completion notices would become cumbersome for the user and it would be inefficient to go for the printed matter each time an output completion notice is received, thus resulting in the reduction of the efficiency of user's work on a personal computer. Moreover, the inconveniences mentioned above become severer in case of a printer with the mail-bin feature, since the frequency of receiving output completion notices is higher compared with the case of a printer without the mail-bin feature because of the existence of print jobs addressed to the user himself/herself from other users and so on. Therefore, in this case, most users would generally wish, even stronger than in the case of a printer without the mail-bin feature, to receive a single output completion notice at the time when the output for all the print jobs addressed to themselves has been completed, in order to avoid the above inconveniences and save themselves the trouble of going for the printed matter separately. The increase in the frequency of transmitting the output completion notice would also cause the increase of the network congestion.

Here, in this specification, the destination of a print job means the destination of an output result (printed matter) obtained by processing a print job, which is generally the user himself/herself who has sent the print job, but, when the mail-printing is specified, the user designated in the mail-printing becomes the destination of a print job.

Another advantage of the mail-bin feature is that the use of this feature can prevent printed matter to be concentrated in a single bin. In the system where multiple personal computers and a printer (especially of a kind with a single bin) are connected by a network so that multiple users share the printer, it often happens that the printed matter of other users has been discharged already in one bin when a user sends an output request (print job) to the printer and thus the user's printed matter becomes buried in the other's. When multiple users' printed matter exists in a mixed state in one bin as mentioned above, there is a problem that it takes a little of time to take out user's own printed matter from a pile of printed matter. Such a situation is apt to occur when a large volume of printed matter is handled or when users forget to pick up their own printed matter. The above mail-bin feature is also intended to solve such a problem.

However, in the printer having the mail-bin feature, it is rather rare, in practice, that one bin is used by only one user, and, in general, multiple users are assigned for each bin. Therefore, in this case, the problem mentioned above still occurs, in other words, there is a possibility that a large amount of printed matter for multiple users (including printed matter for themselves from themselves as well as printed matter for themselves from other users) may remain in one bin when the users forget to pick up their own printed matter.

SUMMARY OF THE INVENTION

An object of this invention is to provide an image forming apparatus having a mail-bin feature which can eliminate the transmission of unwanted output completion notices when it receives multiple print jobs addressed to the same user, a control method thereof, and a computer program product therefor.

Another object of this invention is, to provide an image forming apparatus which has a function of serving to prevent such a situation in the case where there is a possibility that printed matter addressed to multiple users exists in one bin in a mixed state, a control method thereof, and a computer program product therefor.

According to an aspect of the invention, an image forming apparatus comprises a receiving unit for receiving a print job, a storing unit for storing the received print job, multiple bins for receiving paper printed based on the stored print job, each of said multiple bins being assigned a specific user, a sending unit, after all of the paper printed based on the print job are discharged to a bin, for sending an output completion notice to a user corresponding to the bin to which the paper is discharged, and a control unit for inhibiting said sending unit from sending the output completion notice if, at the time when all of the paper printed based on the print job have been discharged to the bin, there exists in the storing unit an unprinted print job which designates as a destination the same user that the print job the output for which has been completed designates.

According to another aspect of the invention, a method for controlling an image forming apparatus having multiple bins for receiving paper printed based on a print job, each of the multiple bins being assigned a specific user, and the apparatus being capable, after all of the paper printed based on the print job are discharged to a bin, of sending an output completion notice to a user corresponding to the bin to which the paper is discharged, comprises the steps of receiving a print job, storing the received print job in a memory unit, and inhibiting the sending of the output completion notice if, at the time when all of the paper printed based on the print job have been discharged to the bin, there exists in the storing unit an unprinted print job which designates as a destination the same user that the print job the output for which has been completed designates.

According to still another aspect of the invention, a computer program product, in an image forming apparatus having multiple bins for receiving paper printed based on a print job, after all of the paper printed based on the print job are discharged to a bin, for sending an output completion notice to a user corresponding to the bin to which the paper is discharged, each of the multiple bins being assigned a specific user, executes the procedures of receiving a print job, storing the received print job in a memory unit, and inhibiting the sending of the output completion notice if, at the time when all of the paper printed based on the print job have been discharged to the bin, there exists in the storing unit an unprinted print job which designates as a destination the same user that the print job the output for which has been completed designates.

According to a further aspect of the invention, an image forming apparatus comprises a receiving unit for receiving a print job, a storing unit for storing the received print job, multiple bins for receiving paper printed based on the stored print job, each of said multiple bins being assigned a specific user, and a sending unit, after all of the paper printed based on the print job are discharged to a bin, for sending an output completion notice to a user corresponding to the bin to which the paper is discharged, wherein the sending unit sends a first output completion notice if, at the time when all of the paper printed based on the print job have been discharged to the bin, there exists in the storing unit an unprinted print job which designates as a destination the same user that the print job the output for which has been completed designates, and sends a second output completion notice if, at the time when all of the paper printed based on the print job have been discharged to the bin, there exists in the storing unit no unprinted print job which designates as a destination the same user that the print job the output for which has been completed designates.

According to a still further aspect of the invention, a method for controlling an image forming apparatus having multiple bins for receiving paper printed based on a print job, each of the multiple bins being assigned a specific user, and the apparatus being capable, after all of the paper printed based on the print job are discharged to a bin, of sending an output completion notice to a user corresponding to the bin to which the paper is discharged, comprises the steps of receiving a print job, storing the received print job in a memory unit, and sending a first output completion notice if, at the time when all of the paper printed based on the print job have been discharged to the bin, there exists in the storing unit an unprinted print job which designates as a destination the same user that the print job the output for which has been completed designates, and sending a second output completion notice if, at the time when all of the paper printed based on the print job have been discharged to the bin, there exists in the storing unit no unprinted print job which designates as a destination the same user that the print job the output for which has been completed designates.

According to a yet further aspect of the invention, an image forming apparatus comprises a receiving unit for receiving a print job, a bin for receiving paper printed based on the received print job, a detecting unit for detecting whether or not there is any paper in the bin, a deciding unit for deciding whether or not, when there is paper in the bin, the destination of the paper existing in, the bin is the same as the destination of the received print job, and a sending unit, if the destination of the paper existing in the bin is not the same as the destination of the received print job, for sending a warning to the destination of the paper existing in the bin.

According to a yet further aspect of the invention, a method for controlling an image forming apparatus having a bin for receiving paper printed based on a received print job, comprises the steps of receiving a print job, detecting whether or not there is any paper in the bin, deciding whether or not, when there is paper in the bin, the destination of the paper existing in the bin is the same as the destination of the received print job, and sending, if the destination of the paper existing in the bin is not the same as the destination of the received print job, a warning to the destination of the paper existing in the bin.

According to a yet further aspect of the invention, a computer program product for an image forming apparatus having a bin for receiving paper printed based on a received print job, executes the procedures of receiving a print job, detecting whether or not there is any paper in the bin, deciding whether or not, when there is paper in the bin, the destination of the paper existing in the bin is the same as the destination of the received print job, and sending, if the destination of the paper existing in the bin is not the same as the destination of the received print job, a warning to the destination of the paper existing in the bin.

According to a yet further aspect of the invention, an image forming apparatus comprises a receiving unit for receiving a print job, multiple bins for receiving paper printed based on the received print job, each of the multiple bins being assigned a specific user, a detecting unit for detecting whether or not there is any paper in each bin, a deciding unit for deciding whether or not, when there is paper in every bin, the destination of the paper existing in each bin is the same as the destination of the received print job, and a sending unit, if the destination of the paper existing in each bin is not the same as the destination of the received print job, for sending a warning to the destination of the paper existing in each bin.

According to a yet further aspect of the invention, a method for controlling an image forming apparatus having multiple bins for receiving paper printed based on a received print job, each of the multiple bins being assigned a specific user, comprises the steps of receiving a print job, detecting whether or not there is any paper in each bin, deciding whether or not, when there is paper in every bin, the destination of the paper existing in each bin is the same as the destination of the received print job, and sending, if the destination of the paper existing in each bin is not the same as the destination of the received print job, a warning to the destination of the paper existing in each bin.

BRIEF DESCRIPTION OF THE DRAWINGS

FIG. 8 is a block diagram illustrating another constitution of the printer shown in FIG. 1;

FIG. 11 is an illustration showing one example of a user information table shown in FIG. 9;

FIG. 13 is an illustration showing another example of the user information table shown in FIG. 9.

DESCRIPTION OF THE PREFERRED EMBODIMENTS

Now, the preferred embodiments of the present invention will be described below using the attached drawings.

First Embodiment

Figure 1:
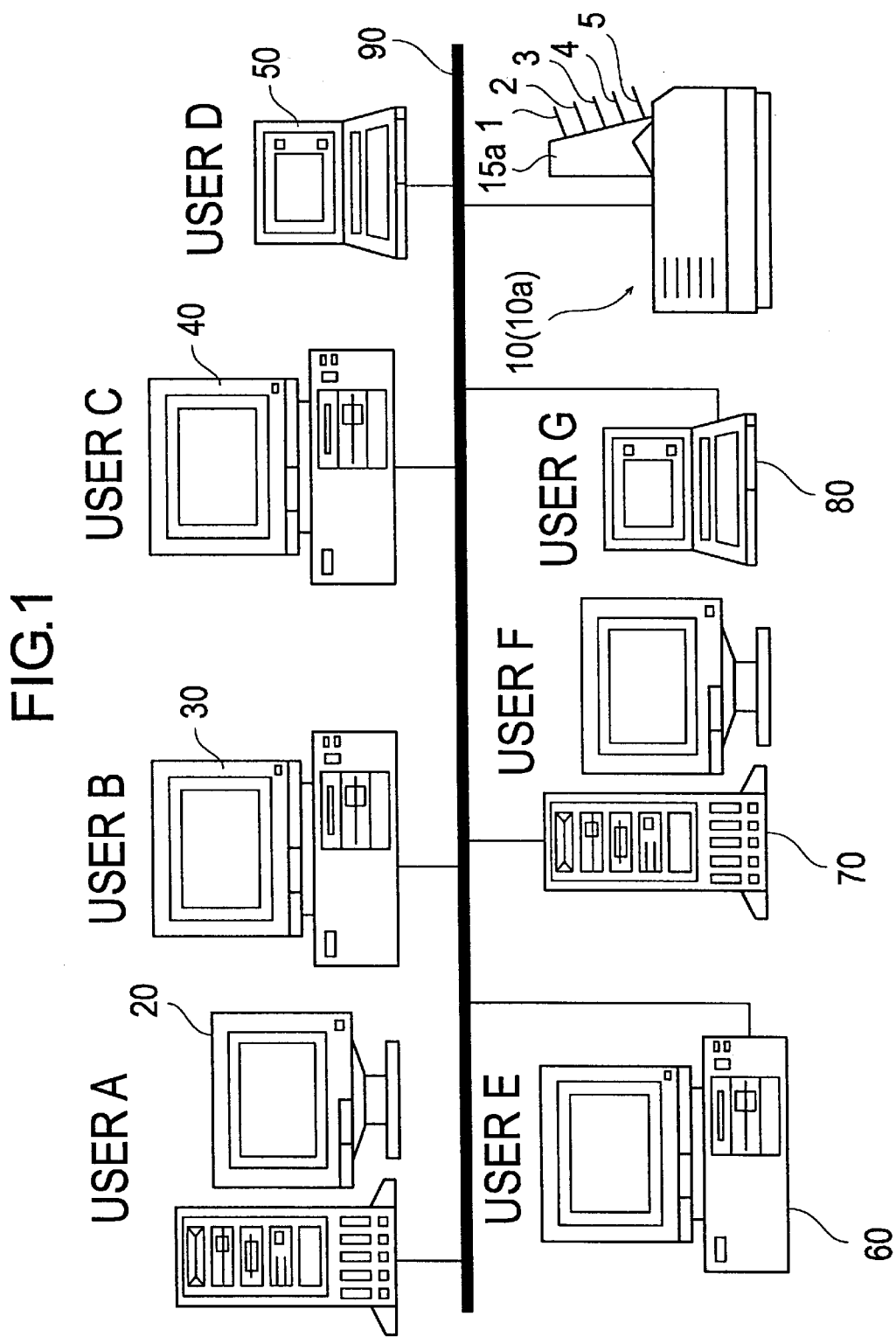
FIG. 1 is an illustration showing the configuration of a network system to which the present invention is applied.

In the network system shown in FIG. 1, a single printer 10 and seven personal computers 20, 30, 40, 50, 60, 70, and 80 are interconnected in such a way as to be able to communicate with each other through a network 90. These personal computers 20–80 are assigned to seven users A through G respectively. Thus, in this system, the single printer 10 is shared by seven users A–G. Each of the users A–G denotes either an individual or a group of individuals in this case.

The constitution of the network 90, i.e., the means to connect the printer 10 with the personal computers 20–80 can be either a wired system such as a system using an Ethernet cable or a wireless system using infrared ray or radio wave.

The number of printers or personal computers connected on the network 90 is, needless to say, arbitrary, not limited to the above-mentioned example. The invention is applicable to any system having one or more image forming apparatus and multiple personal computers.

Moreover, the type of the image forming apparatus can be, in addition to the printer, a combined machine such as a digital copying machine, which is a combined machine of a scanner and a printer, or a facsimile machine. Further, the system can be a system which comprises multiple image forming apparatuses of different kinds.

The printer 10 has the mail-bin feature and is provided with a paper discharge unit having multiple (five in this case) bins 1, 2, 3, 4, and 5 to which the printed paper is discharged. The bins 1–5 are used in case the paper discharge unit is to be used as mail-bin. When the paper discharge unit (bins 1–5) is to be used as mail-bin, such a method as to pre-assign users who are to use bins for each bin and discharge all the printed matter for the users only to the respective bins to which they are pre-assigned is generally employed. For example, the bin 1 has the users A and D assigned, the bin 3 has the users C, E, and G assigned the bin 4 has the user B assigned, the bin 5 has the user F assigned, and the bin 2 has no user assigned. As can be seen from the above, for one bin either a single user or multiple users can be assigned. Incidentally, the bins 1–5 are provided by mounting an optional paper discharge device 15a on the printer main body in this case.

When the printer 10 receives a print job from any of the personal computers 20–80, it performs printing based on the received print job and discharges the printed matter to one of the bins. The bin to which the printed matter is discharged is a bin that is assigned the user as the destination which is recognized by analyzing destination information (identification information on a job-sending personal computer as well as information whether or not the mail-printing is used and, if so, on its destination) included in the print job. The destination of the print job is a user himself/herself who sent the print job in the case except the mail-printing, while it is a user specified in the mail-printing in the case of the mail-printing, as mentioned above. When the output for the print job is completed, an output completion notice is transmitted to the user (more precisely the personal computer which the user is assigned and so forth) who is the destination of the print job. In this case, according to one aspect of the invention, when there exist multiple print jobs for the same user, the output completion notice is transmitted to the user at a point of time when the output for all the print jobs addressed to the particular user has been completed, as will be explained later in detail.

Figure 2:
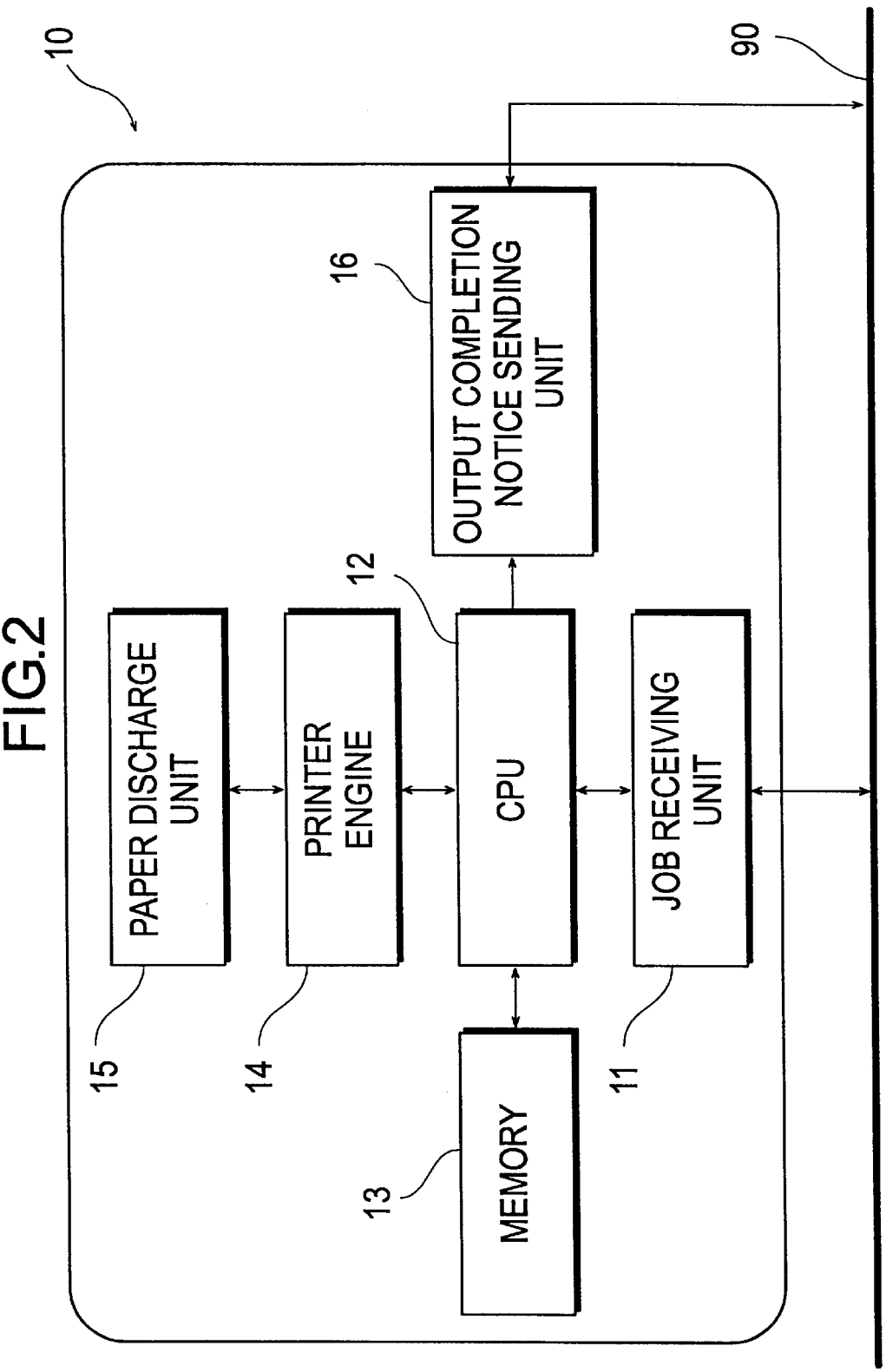
FIG. 2 is a block diagram illustrating the constitution of a printer shown in FIG. 1.

In FIG. 2, the printer 10 comprises a job receiving unit 11, a CPU 12, a memory 13, a printer engine 14, a paper discharge unit 15, and an output completion notice sending unit 16.

The job receiving unit 11 is a part of the network interface for connecting the printer 10 with the personal computers 20–80 on the network 90 and receives print jobs sent by the personal computers 20–80. The print job consists of identification information on a job-sending personal computer, print mode information (including information whether or not the mail-printing is used and, if so, on its destination), and image data and so on. The first two of the information are stored, for example, in a header portion of the print job.

The CPU 12 controls separate parts of the printer 10 and has a function of, when there exist multiple print jobs for the same user, setting the user as the destination of sending an output completion notice (hereinafter referred to as "output completion notice destination") at a point of time when the output for all the print jobs addressed to the particular user has been completed, and making the output completion notice be sent to the set output completion notice destination, in accordance with the control flowchart which will be described below. The CPU 12 also has a function of transforming (rasterizing) the image data included in the received print job into a bitmap data format in which the printer engine 14 can print and further, as the need arises, performing layout-processing such as the so-called Nin1.

The memory 13 comprises ROM that allows reading only and RAM that allows both reading and writing freely (both not shown) (and, as the case may be, a flash memory as well that allows electrical rewriting). The ROM stores control programs and the RAM stores print jobs and a print queue which will be described later. In case of the printer 10 having the mail-bin feature, information on the assignment of the users A–G for each bin 1–5 is stored in the RAM (or the flash memory) as a user assignment table.

Figures 3, 4:
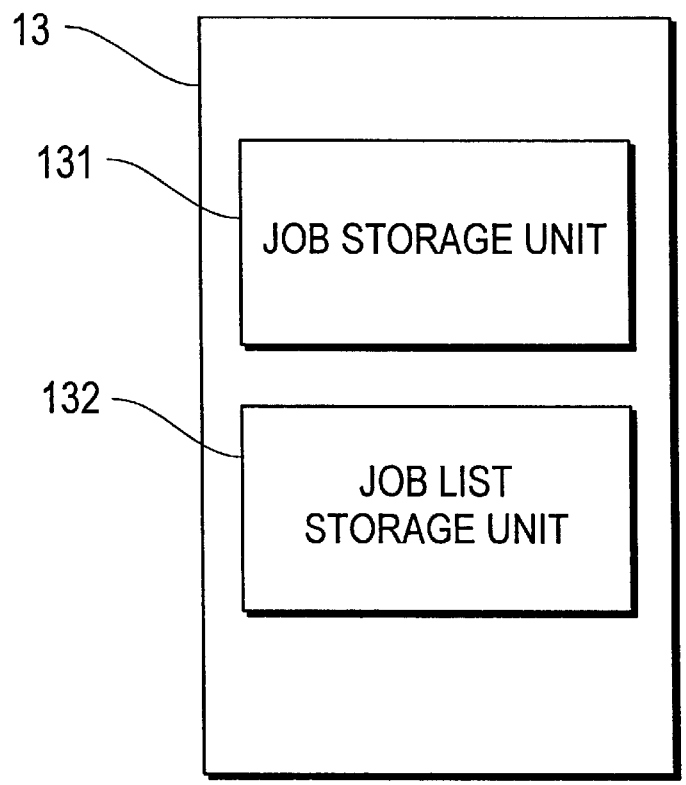
FIG. 3 is an illustration showing the constitution of a memory shown in FIG. 2.
FIG. 4 is an illustration showing one example of a print queue in a job list storage unit shown in FIG. 3.

As shown in FIG. 3, the memory 13 (RAM) comprises a job storage unit 131 and a job list storage unit 132. The job storage unit 131 stores (accumulates) each print job received until the output therefor is completed for the time being. The job list memory 132 stores a list of print jobs not yet outputted which are stored in the job storage unit 131 (hereinafter referred to as a "print queue"). Incidentally, the print jobs are processed and outputted in the order that they are stored in the job memory 131.

One example of the print queue is as shown in FIG. 4. In a word, the print queue is a list of received print jobs which are not yet outputted and which are stored in a prescribed format in the order of storage, and is updated each time a new print job is received or the output for the print job at the top of the list is completed. Specifically, a newly received print job is first placed at the very end of the list. Each time a print job at the top of the list (job 1), which means the oldest print job on the list in the print jobs not yet outputted currently, is processed for the output therefor to be completed, and deleted from the list, the order of the print job is raised successively one by one. When the job finally reaches the top position (job 1), it is deleted from the list at a point of time when it is processed and the output therefor is completed. In the case shown in FIG. 4, eight print requests (print jobs) from the users A, B, and C remain unoutputted (or unprocessed). As shown in this case, the number of print jobs which each user A–G sends may not necessarily be one, but rather there are many cases where the same user sends multiple print jobs successively to the single printer 10.

The printer engine 14 outputs an image data rasterized (and layout-processed) by the CPU 12 onto a print paper in accordance with the print mode.

The paper discharge unit 15 is equipped with multiple bins 1–5 and holds the discharged print paper onto which the printer engine 14 printed. The paper discharge unit 15 includes the aforementioned paper discharge device 15a.

The output completion notice sending unit 16 is, similar to the job receiving unit 11, a part of the network interface for connecting the computer 10 with the personal computers 20–80 on the network 90, and sends an output completion notice to the destination of a print job in accordance with the command by the CPU12.

According to one aspect of the invention, in an image forming apparatus having the mail-bin feature, when there exist multiple print jobs for the same user, an output completion notice is transmitted to the user at a point of time when the output for all the print jobs addressed to the particular user is completed. More specifically, each time one print job is completed, a decision is made whether or not there is any print job addressed to the same user (for example, the user A) that the print job the output for which has been completed this time is addressed to in the print jobs not yet outputted which are stored in the job storage unit 131, looking up the print queue in the job list storage unit 132 in the memory 13 (RAM), and then the output completion notice shall be transmitted to the user A, only if it is decided that there is no such print job, i.e., only when the output for all the print jobs addressed to the user A is completed.

Figure 5:
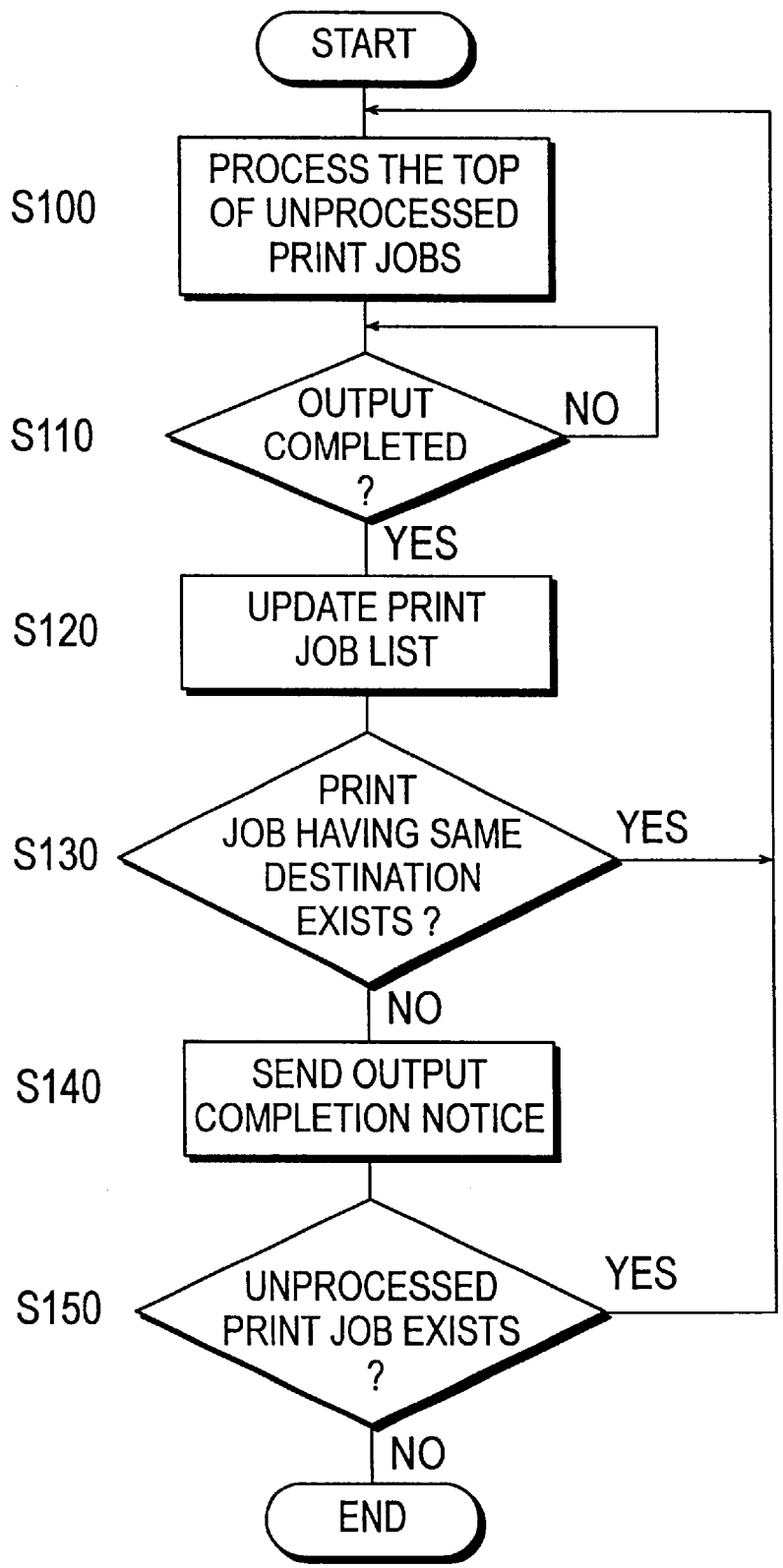
FIG. 5 is a control flowchart for describing the control operation of the printer corresponding to the first embodiment of the present invention.

Next, the control operation of the printer 10 corresponding to this embodiment will be, explained below in accordance with the control flowchart shown in FIG. 5. FIG. 5 shows a series of procedures on the particular printer 10 from the successive execution of the print jobs not yet outputted which are stored in the job storage unit 131, i.e., the print jobs listed on the print queue in the job list storage unit 132, through to the transmission of the output completion notice to each of the relevant users. Incidentally, the control flowchart shown in FIG. 5 is stored in the ROM of the memory 13 as a control program and is executed by the CPU 12.

First, at the step S100, it selects a print job at the top of the list in the unprocessed print jobs listed on the print queue in the job list storage unit 132 from the print jobs accumulated in the job storage unit 131 in the memory 13 (RAM), processes the selected print job, makes the printer engine 14 print, and makes the resultant printed paper discharged to a bin of the discharge destination of the paper discharge unit 15. The bin of the discharge destination is a bin which is assigned the user of the destination of a print job, as mentioned above.

Then, at the step S110, it makes a decision whether or not the output for the print job is completed. As a result of this decision, if the output is completed (S110:YES), it proceeds to the step S120, and if the output is not completed (S110: NO), it waits.

At the step S120, it deletes the print job the output for which has been completed from the print queue in the job list storage unit 132 and updates the contents of the print queue. With the deletion of the top print job due to the output completion, each print job listed on the print queue has its order (job number) raised by one. Simultaneously with such deletion from the print queue, the print job the output for which has been completed is also deleted from the job storage unit 131.

Then, at the step S130, it makes a decision whether or not there exists any print job addressed to the same user that the print job which has been processed at the step S100 this time and the output for which has been completed is addressed to in the unprocessed print jobs listed on the print queue in the job list storage unit 132. As a result of this decision, if there exists any print job addressed to the same user (S130:YES), it goes back to the step S100 and executes the aforementioned process on the next print job to be processed, i.e., another print job which is currently at the top of the print queue, and if there exists no print job addressed to the same user (S130:NO), it proceeds to the step S140.

At the step S140, it concludes that the outputs for all the print jobs addressed to the same user has been completed, sets the user of the destination of the print job which has been processed at the step S100 and the output for which has been completed as an output completion notice destination, and transmits to the output completion notice sending unit 16 a command to send an output completion notice. On receiving this command, the output completion notice sending unit 16 sends the output completion notice to the user the output for all the print jobs addressed to whom has been completed.

Then, at the step S150, it makes a decision whether or not there exists any unprocessed print job, looking up the print queue in the job list storage unit 132. As a result of this decision, if there still exists any unprocessed print job (S150:YES), it returns to the step S100 and performs the aforementioned process on the next print job to be processed, i.e., another print job which is currently at the top of the print queue, and if there exists no longer any unprocessed print job (S150:NO), it terminates the aforementioned series of procedures.

When the above-mentioned procedures are applied to the case of FIG. 4, it goes as follows.

At a point of time when the output for the top print job (job 1) addressed to the user A is completed, there still exist four print jobs addressed to the user A in the print queue of the job list storage unit 132 (jobs 2–5 in FIG. 4). Therefore, no output completion notice will be sent to the user A at this time yet. Even after the output for the jobs 2–4 in FIG. 4 is completed, no output completion notice for the user A will be sent, since there still exists a print job addressed to the user A (job 5 in FIG. 4). Then, at a time when the output for the job 5 in FIG. 4 is completed, i.e., when the output for all the print jobs addressed to the user A is completed, an output completion notice will be sent to the user A. Similarly, an output completion notice will be sent to the user B when the output for the job 6 in FIG. 4 is completed, and another output completion notice will be transmitted to the user C when the output for the job 8 in FIG. 4 is completed.

The series of procedures shown in FIG. 5 is also applicable to a printer having no mail-bin feature.

Therefore, according to this embodiment, since in the printer 10 having the mail-bin feature, at a time when the output for all the print jobs addressed to the same user, an output completion notice is transmitted to the particular user, the user needs not to receive the output completion notice more than once and needs not to receive unwanted output completion notices, no matter how many print jobs for the user exist by the user's sending multiple print jobs to the same printer 10 or by other users' sending multiple print jobs for the user to the same printer 10. Consequently, as well in the printer 10 having the mail-bin feature, each user can be saved from the trouble of receiving successive output completion notices, and can increase efficiency of the work such as input operation on a personal computer.

It also serves to ease the congestion of the network 90, since it makes it unnecessary for the printer 10 to transmit unwanted output completion notices onto the network 90.

Second Embodiment

In the second embodiment, in case multiple print jobs addressed to the same user are accepted, as compared with the first embodiment wherein an output completion notice is transmitted to the user at the time when the output for all the print jobs is completed, an output completion notice is transmitted to the user each time the output for every print job is completed, while the contents of the output completion notice are changed appropriately depending on whether or not another print job is accepted at the time when the output for the first print job is completed.

This embodiment is due to the consideration of the possibility that depending on the circumstances there may be a user who does not want to receive one output completion notice in a bulk at the time when the output for all of the multiple print jobs addressed to the user is completed. In other words, depending on the circumstances such a case as a user wants to go for the printed paper outputted first as soon as possible can be thought of. In this case, if other print jobs for the user are accepted and if the output completion notice is to be transmitted only after the output for all the print jobs is completed, that user can not go for the printed paper outputted first a long time against his/her will.

Incidentally, the printer corresponding to the second embodiment has a basic constitution similar to that of the printer 10 corresponding to the first embodiment shown in FIG. 2, so that explanation therefor will be omitted.

Next, the control operation of the printer 10 corresponding to this embodiment will be explained below in accordance with the control flowchart shown in FIG. 6. The control flowchart shown in FIG. 6 is stored in the ROM of the memory 13 as a control program and is executed by the CPU 12.

Figure 6:
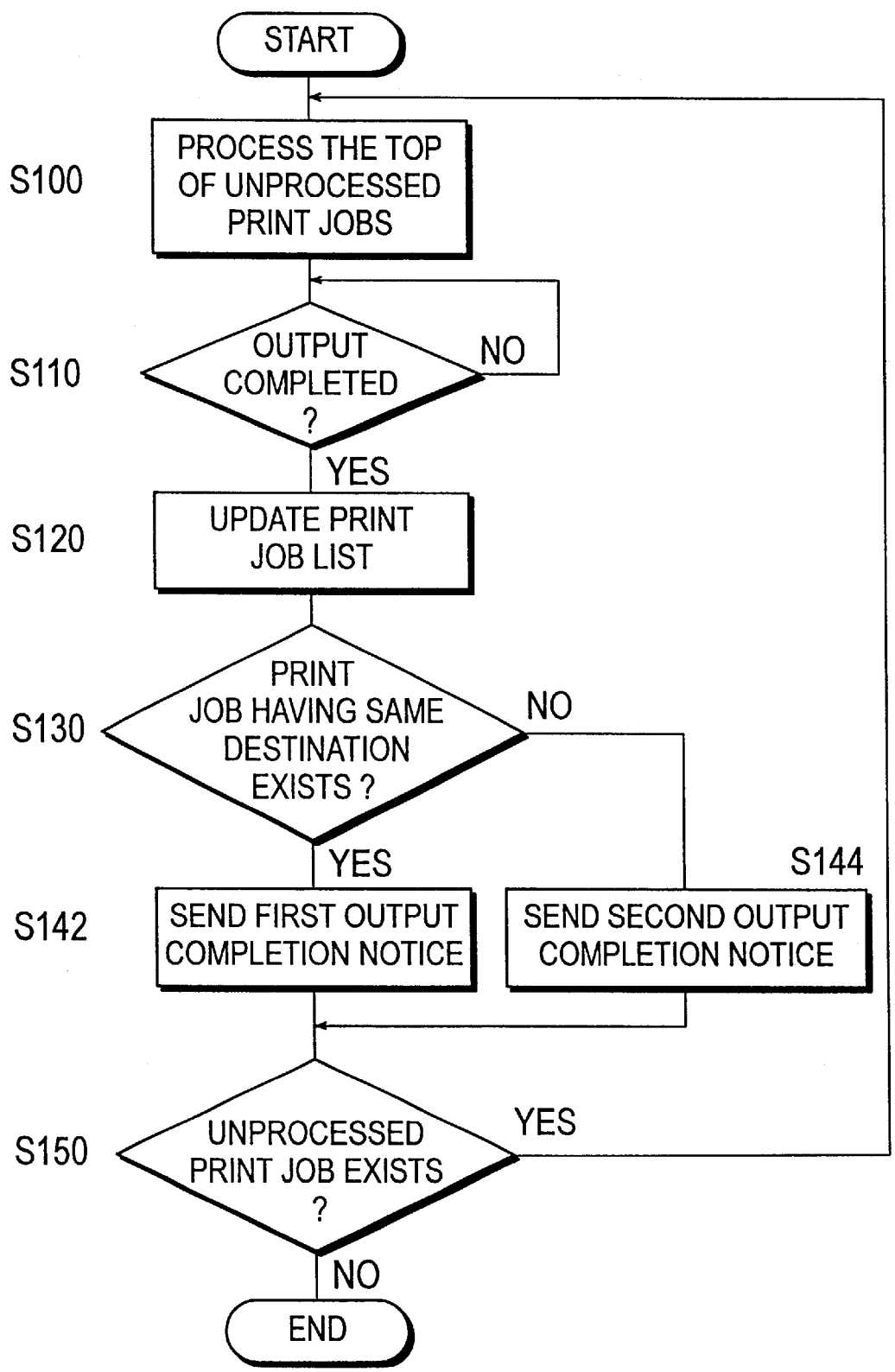
FIG. 6 is a control flowchart for describing the control operation of the printer corresponding to the second embodiment of the present invention.

In this embodiment, as shown in FIG. 6, the steps S142 and S144 are inserted to and the step S140 is removed from the flowchart shown in FIG. 5.

The steps S100–S130 are similar to those steps in the flowchart shown in FIG. 5, so that explanation therefor will be omitted. In this embodiment, however, as a result of the decision of the step S130, if there exists any print job addressed to the same user (S130:YES), it proceeds to the step S142, and if there exists no print job addressed to the same user (S130:NO), it proceeds to the step S144.

Figures 7A, 7B, 9:
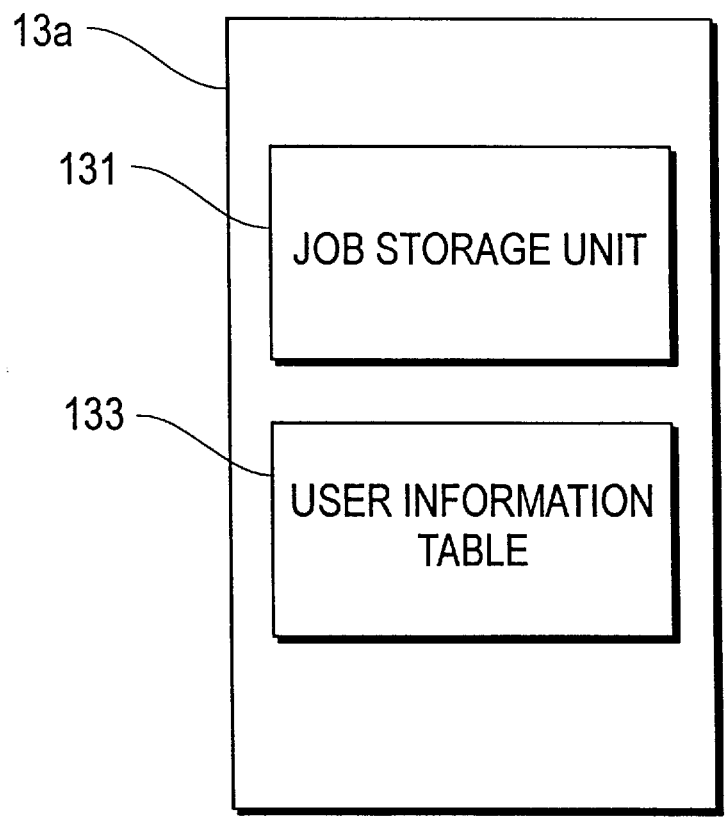
FIG. 7A is an illustration showing one example of the contents of the first output completion notice in FIG. 6.
FIG. 7B is an illustration showing one example of the contents of the second output completion notice in FIG. 6.
FIG. 9 is an illustration showing the constitution of a memory shown in FIG. 8.

At the step S142, since another print job addressed to the same user is accepted at the time when the output for the first print job is completed, it sets the user as an output completion notice destination, transmits to the output completion notice sending unit 16 a command to send the first output completion notice which has the contents suitable for this case, and proceeds to the step S150. On receiving this command, the output completion notice sending unit 16 sends the user a message stating "A print output for you has been completed. At present, another print job for you is being accepted." as shown in FIG. 7A, for example.

On the other hand, at the step S144, since no other print job addressed to the same user is accepted at the time when the output of the first print job is completed, it sets the user as an output completion notice destination, transmits to the output completion notice sending unit 16 a command to send the second output completion notice which has the contents suitable for this case, and proceeds to the step S150. On receiving this command, the output completion notice sending unit 16 sends the user a message stating "A print output for you has been completed. At present, no other print job for you is found." as shown in FIG. 7B, for example.

Incidentally, the first output completion notice and the second output completion notice are stored in the ROM (or flash memory) of the memory 13 in advance.

The step S150 is similar to that step in the flowchart shown in FIG. 5, so that explanation therefor will be omitted.

Thus, according to this embodiment, since the contents of the output completion notice are changed appropriately depending on whether or not another print job is accepted at the time when the output for the first print job is completed, the user can decide properly according to his/her own convenience whether he/she will go for the printed matter right away or later, considering the contents of the output completion notice. In other words, the user can, according to his/her own choice, go for the first printed matter right away if it is an urgent one, or go for the printed matter once in a bulk after the output for all the print job addressed to the user himself/herself if the printed matter outputted first is not an urgent one and if another print job addressed to the user himself/herself is waiting to be processed.

Third Embodiment

The third embodiment will be described below by using the network system shown in FIG. 1 again. However, the printer corresponding to the third embodiment will be identified with the symbol "10a" in order to differentiate it from the printer 10 corresponding to the first embodiment.

Similar to the printer 10, the printer 10a has the mail-bin feature and is equipped with a paper discharge unit having multiple (five in this case) bins 1, 2, 3, 4, and 5 to which the printed paper (printed matter) is discharged. The bins 1–5 are used in case the paper discharge unit is to be used as mail-bin. The method of mail-bin usage can be divided into a "normal usage method" and a "special usage method". In the "normal usage method", the users who may use bins are assigned to each bin in advance and the use of each bin is monopolized by the users whom each bin is assigned, as mentioned above. On the other hand, in the "special usage method", the users who may use bins are not assigned for each bin in advance, but rather the printer 10a automatically discharges the printed matter to an empty bin and notifies the user who sent the print job concerned of the identification information on the bin to which the printed matter is discharged (e.g., the bin number). Such mail-bin feature can be realized by designating the printing with the destination (user) of the printed matter specified (hereinafter referred to as "mail-printing", on a print mode setting screen of each personal computers 20–80, for example.

When the printer 10a receives a print job from any of the personal computers 20–80, it performs printing based on the received print job and discharges the printed matter to one of the bins. If the mail-bin is used in the normal usage method, the bin of the discharge destination is a bin that is assigned the user as the destination which is recognized by analyzing destination information (identification information on a job-sending personal computer as well as information whether or not the mail-printing is used and, if so, on its destination) included in the print job, and if the mail-bin is used in the special usage method, the bin of the discharge destination is a bin decided arbitrarily according to the prescribed rule. In either case, the destination of the print job is a user specified in the mail-printing in the case of the mail-printing, while it is a user himself/herself who sent the print job in the case except the mail-printing, as mentioned above. When the discharge of the printed matter is completed, an output completion notice is transmitted to the user who is the destination of the print job. In this case, according to another aspect of the invention, when there remains another printed matter discharged earlier in the bin to which the printer 10a is about to discharge the printed matter this time for a certain print job, the output completion notice is transmitted to the destination (user) of the printed matter remaining in the same bin before the print job is processed and the output completion notice is transmitted to the corresponding user. This makes it possible to notify each user of the presence of the remaining printed matter to be picked up.

In FIG. 8, the printer 10a comprises a job receiving unit 11, a CPU 12, a memory 13, a printer engine 14, a paper discharge unit 15, an output completion notice sending unit 16 and an output removal detecting unit 17. Incidentally, since the printer 10a has a basic constitution similar to that of the printer 10 shown in FIG. 2, the same constitutional elements will be identified using the same symbols and mainly the parts which differ will be only described below.

The CPU 12 controls separate parts of the printer 10a and has a function of setting an output completion notice destination so that it serves to prevent such a situation in the case where there is a possibility that printed matter addressed to multiple users exists in one bin in a mixed state, and adjusting the timing of sending the output completion notice, in accordance with the control flowchart which will be described later. In setting the output completion notice destination, information (identification information on a job-sending personal computer as well as information whether or not the mail-printing is used and, if so, on its destination) included in the print job received by the job receiving unit 11 and the detection result of the output removal detecting unit 17 are considered.

The memory 13a comprises ROM and RAM (and, as the case may be, a flash memory as well). The ROM stores control programs and the RAM stores print jobs and a user information table which will be described later. In,case of the printer 10a having the mail-bin feature, information on the assignment of the users A–G for each bin 1–5 is stored in the RAM (or the flash memory) as a user assignment table.

As shown in FIG. 9, the memory 13a (RAM) comprises a job storage unit 131 and a user information table 133. The job storage unit 131 stores (accumulates) each print job received until the output therefor is completed for the time being, as mentioned above. The user information table 133 is a table where information on the destination (user) of the printed matter discharged to each bin 1–5 (e.g., user name, user ID, etc.) (hereinafter referred to as "user information") is stored for each bin (refers to FIG. 11 and FIG. 13). The user information in this table 133 will not be deleted until the corresponding printed matter is removed from the bin to which it is discharged. The destination (user) of the printed matter remaining in each bin is identified by looking up this user information table 133.

The output completion notice sending unit 16 is a part of the network interface for connecting the printer 10a with the personal computers 20–80 on the network 90, and sends an output completion notice to the set output completion notice destination (the personal computers 20–80 of the users A–G) at the adjusted timing, in accordance with the command by the CPU 12. Incidentally, if the mail-bin is used in the special usage method, the users are not assigned to each bin in advance, so that the output completion notice includes the identification information on the bin to which the printed matter is discharged (e.g., the bin number) in addition to the notice indicating that the output is completed.

The output removal detecting unit 17 detects whether or not any printed matter remains in each bin 1–5, i.e., whether or not the printed matter has been removed from each bin 1–5. This detection is conducted for each bin 1–5. For example, the output removal detecting unit 17 consists of sensors for detecting whether or not paper exists which are mounted on the respective bins 1–5.

In another aspect of the invention, it is so designed as to set an output completion notice destination so that it serves to prevent such a situation in the case where there is a possibility that printed matter addressed to multiple users exists in one bin in a mixed state, and adjust the timing of sending the output completion notice. More specifically, when there remains another printed matter discharged earlier in the bin to which the image forming apparatus (printer 10a) is about to discharge the printed matter this time for a certain print job, the output completion notice is transmitted to the destination (user) of the printed matter remaining in the same bin before the print job is processed and the output completion notice is transmitted to the corresponding user. In other words, each time the destination of the printed matter to be discharged to the same bin changes, an output completion notice is transmitted to the destination of the previously discharged printed matter remaining in that bin.

For the sake of convenience, the description of the third embodiment will be limited to the case where the mail-bin is used in the normal usage method, and the case where the mail-bin is used in the special usage method will be described as the fourth embodiment separately.

As mentioned above, the third embodiment is a case where the mail-bin is used in the normal usage method, i.e., the users who may use bins are pre-assigned for each bin. Let us assume that the users A and D are assigned to the bin 1, the user C, E, and G are assigned to the bin 3, the user B is assigned to the bin 4, and the user F is assigned to the bin 5, while no one is assigned to the bin 2 (refers to FIG. 11).

In this embodiment, when, in such a state that the previously discharged printed matter for a certain user (e.g., user D) still remains in any bin (bin 1 in this case), an attempt is made to process a print job for another user (e.g., user A) which designates the same bin as the discharge destination, an output completion notice is transmitted to the user (user D) the printed matter for whom still remains in the same bin before the print job is processed and the output completion notice is transmitted to the other user (user A).

Incidentally, although the printer 10a having the mail-bin feature is used as an example of an image forming apparatus in describing this embodiment, it should not be limited to this and an image forming apparatus equipped with a paper discharge unit having only one bin may be used as well.

Figure 10:
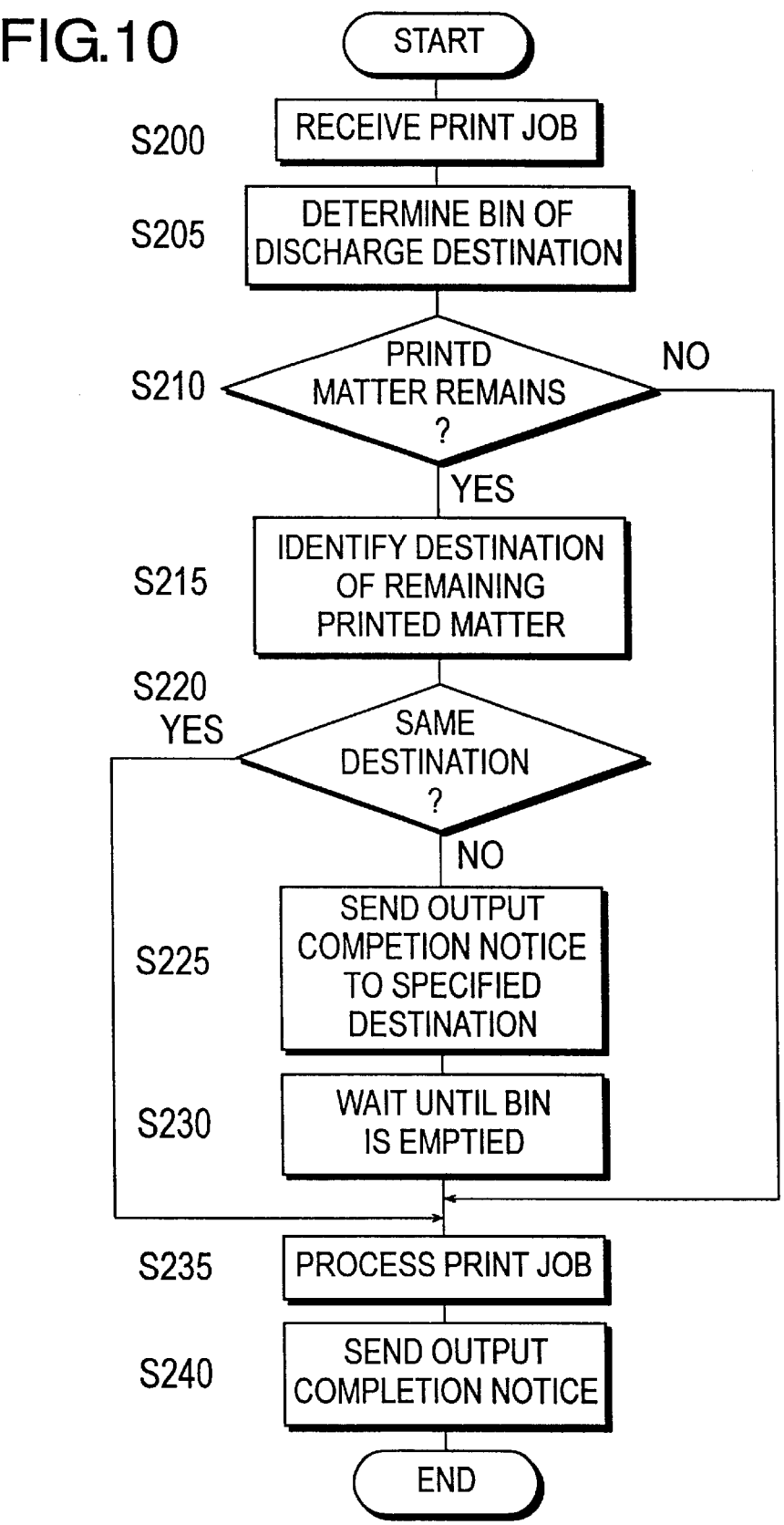
FIG. 10 is a control flowchart for describing the control operation of the printer corresponding to the third embodiment of the present invention.

Next, the control operation of the printer 10a corresponding to this embodiment will be described in accordance with the control flowchart shown in FIG. 10. FIG. 10 shows a series of procedures on the printer 10a for receiving a print job addressed to a certain user (e.g., user A), processing the print job, and then sending an output completion notice to the user A who is the destination of the print job. Incidentally, the control flowchart shown in FIG. 10 is stored in the ROM of the memory 13a as a control program and is executed by the CPU 12.

First, at the step S200, when the job receiving unit 11 receives a print job for a certain user (e.g., user A), the received print job is stored (accumulated) temporarily in the job storage unit 131 in the memory 13a.

Then, at the step S205, it searches a bin to which the user (user A) of the destination of a print job to be processed this time (e.g., the print job received at the step S200) is assigned, looking up the user information table 133 in the memory 13a, and decides that the searched bin (bin 1 in this case) shall be a bin of the discharge destination for the print job concerned.

Then, at the step S210, it makes a decision whether or not any previously discharged printed matter remains in the bin of the discharge destination (bin 1) determined at the step S205, based on the detection result of the output removal detecting unit 17. As a result of this decision, if there remains no printed matter (S210:NO), it goes directly to the step S235, since there is no possibility that printed matter for multiple users exists in the same bin in a mixed state, and if there remains any printed matter (S210:YES), it goes to the step S215.

At the step S215, it identifies the destination (user) of the printed matter remaining in the bin of the discharge destination (bin 1), looking up the user information table 133 in the memory 13a.

At the step S220, it makes a decision whether or not the destination identified at the step !S215 is the same as the destination (user A) of the print job concerned. As a result of this decision, if both destinations (users) are the same (S220:YES), it goes directly to the step S235 since there is no possibility that printed matter for multiple users exists in the same bin in a mixed state even if the printed matter is discharged to the bin of the discharge destination (bin 1), and if both destinations (users) are not the same (S220:NO), it goes to the step S225.

At the step S225, since in this case printed matter for multiple users could exist in the same bin in a mixed state if the printed matter was discharged to the bin of the discharge destination (bin 1), it sets the destination (e.g., user D) identified at the step S215 as an output completion notice destination, and transmits to the output completion notice sending unit 16 a command to send an output completion notice. On receiving this command, the output completion notice sending unit 16 sends the output completion notice to the set output completion notice destination, i.e., the destination (user D) identified at the step S215.

Then, at the step S230, it waits until the output removal detecting unit 17 detects the fact that the printed matter has been removed from the bin of the discharge destination (bin 1), i.e., that the bin of the discharge destination (bin 1) is emptied (prohibition of the processing of the print job), and advances to the step S235 at a point of time when the fact that the bin of the discharge destination (bin 1) is emptied is detected. Consequently, the existence of the printed matter for multiple users in one bin in a mixed state can be prevented surely. As soon as it detects the fact that the bin of the discharge destination (bin 1) is emptied, it also deletes the user information (user D) on that bin (bin 1) from the user information table 133 in the memory 13a.

At the step S235, it processes the print job for which the bin of the discharge destination is determined at the step S205, makes the printer engine 14 print, and makes the resultant printed matter discharged to the bin (bin 1) which is selected as a bin of the discharge destination this time in the paper discharge unit 15.

Then, at the step S240, it sets the destination (user A) of the print job processed at the step S235 as an output completion notice destination, and transmits to the output completion notice sending unit 16 a command to send an output completion notice. On receiving this command, the output completion notice sending unit 16 sends the output completion notice to the set output completion notice destination, i.e., the destination (user A) of the print job concerned. In addition, simultaneously with the transmission of the output completion notice, information on the user of the output completion notice destination (user A) is written at the position of the bin (bin 1) which is selected as a bin of the discharge destination this time on the user information table 133 in the memory 13a.

Therefore, according to this embodiment, when, in such a state that the previously discharged printed matter for a certain user (user D) still remains in any bin (bin 1), an attempt is made to process a print job for another user (user A) which designates the same bin as the discharge destination, an output completion notice is transmitted to the user (user D) the printed matter for whom still remains in the same bin before the print job is processed and the output completion notice is transmitted to the other user (user A), so that it makes it possible to notify each user of the presence of the remaining printed matter to be picked up, thereby serving to prevent such a situation that printed matter for multiple users exists in one bin in a mixed state.

Now, various modifications can be thought of as described below for the procedures shown in the control flowchart of FIG. 10.

For example, in the control flowchart of FIG. 10, at the step S230, it waits until the bin of the discharge destination is emptied. This is because it is basically preferable to perform the next output after the previously discharged printed matter has been removed for the sake of reliability, in order to prevent such a situation that printed matter for different users exists in one bin in a mixed state. However, if the user who has received the output completion notice does not come to pick up the printed matter for a long time, there will be a stoppage of output to that bin. To avoid such an inconvenience, it is possible to set up a time to wait (waiting time) and allow the next process to be started even if the bin has not been emptied when a prescribed time has passed since the output completion notice was transmitted at the step S225.

Here, the "prescribed time" is preferably an adjustable time that a user can arbitrarily set up in advance. For example, if the prescribed time is set to "0", the printer 10a processes a print job immediately after the output completion notice is transmitted to the user the printed matter for whom is still left remaining. On the other hand, if the prescribed time is set to "infinity", the printer 10a will not process a print job unless the printed matter left in a bin of the discharge destination is removed.

Moreover, in this case, it is preferable to cancel a waiting state (prohibition of the processing of a print job) and start to process a print job as soon as printed matter has been removed from a bin during a waiting period, regardless of the length of the set waiting time.

In the above-mentioned modification, however, a waiting state is canceled when the prescribed time has passed, even if the printed matter is not removed yet, so that the next output is conducted successively in such a state that the previously discharged printed matter still remains in a bin of the discharge destination, whereby the possibility arises that printed matter for multiple users might exist in one bin in a mixed state. In this case, if one user picks up the printed matter for the user himself/herself and returns the printed matter for other users back to the same bin, it is impossible to identify the printed matter for whom is removed and the printed matter for whom is returned.

In order to solve this, the following two methods can be thought of, for example.

The first method is as follows.

The user who received the output completion notice takes out all the printed matter discharged in the bin to which the user himself/herself is assigned, irrespective of whether or not the printed matter is addressed to the user himself/ herself. At this time, the printer 10a proceeds to the next process judging that all the printed matter which had remained in the bin was removed. After that, the user extracts the printed matter addressed to himself/herself from the printed matter taken out of the bin and transfers the rest of the printed matter to another tray for the exclusive use without returning it to the same bin.

The second method is as follows. This method can be realized by utilizing the user information table 133 which is intended for identifying users the printed matter for whom remains in the bins.

The user who received the output completion notice enters his/her user information into the printer 10a by means of some appropriate means such as an operating panel or a ten key pad (both not shown) provided on the printer 10a when he/she goes for the printed matter addressed to him/her to the bin to which he/she is assigned. As a result of this, information about that user is deleted from the user information table 133 in the memory 13a. Alternatively, it is also possible to eliminate the users information about himself/ herself by utilizing the network 90, for example, by sending a reply to the output completion notice from the printer 10a. For the user whose user information has been deleted from the user information table 133 in this way, the printer 10a does not transmit the output completion notice for reminding each user of the presence of the remaining printed matter to be picked up, judging that the printed matter for that user has been removed from the bin.

When the method shown in the above-mentioned modification is applied to the example of FIG. 11, it goes as follows.

Let us think about a case of receiving a print job for the user A in the example of FIG. 11. In this case, a bin of the discharge destination for the print job concerned is the bin 1, and there remains in this bin 1 both the printed a matter for the user A and the printed matter for user D as the printed matter previously discharged. Accordingly, output completion notices are first transmitted to the user A and the user D. Then, after the bin 1 is emptied or a prescribed time has passed, the print job for the user A is processed. Then, when the output for the bin 1 is completed, the output completion notice for the print job concerned is transmitted to the user A, and the user A's information is written at the position of the bin 1 in the user information table 133.

Let us now think about a case of receiving a print job for the user G in the same example of FIG. 11. In this case, users the printed matter for whom remains in the bin 3 to which the user G is assigned are the user C and the user E. Accordingly, output completion notices are first transmitted to the user C and the user E. Then, after the bin 3 is emptied or a prescribed time has passed, the print job for the user G is processed. Then, when the output for the bin 3 is completed, the output completion notice for the print job concerned is transmitted to the user G, and the user G's information is written at the position of the bin 3 in the user information table 133.

Fourth Embodiment

The printer corresponding to the fourth embodiment has a basic constitution similar to that of the printer 10a corresponding to the third embodiment shown in FIG. 8, so that the explanation therefor will be omitted.

The fourth embodiment is, as compared with the third embodiment where the mail-bin is used in the normal usage method, a case where the mail-bin is used in the special usage method, i.e., a case where the users who may use bins are not pre-assigned for each bin. In this case, the printer 10a automatically discharges the printed matter for each user to an empty bin, and notifies the user who sent the print job concerned of the identification information on the bin of the discharge destination (e.g., the bin number).

In this embodiment, the output completion notice can be transmitted in the following two modes. The first mode is such that, when, in such a state that the printed matter remains in all the bins 1–5 of the paper discharge unit 15 which is used as mail-bin, an attempt is made to process a print job for a certain user, output completion notices are transmitted to all the users the printed matter for whom is left remaining. The second mode is such that output completion notices are transmitted only to the users the printed matter for whom is left remaining on one arbitrary bin to which the printer 10a is about to output.

Figure 12:
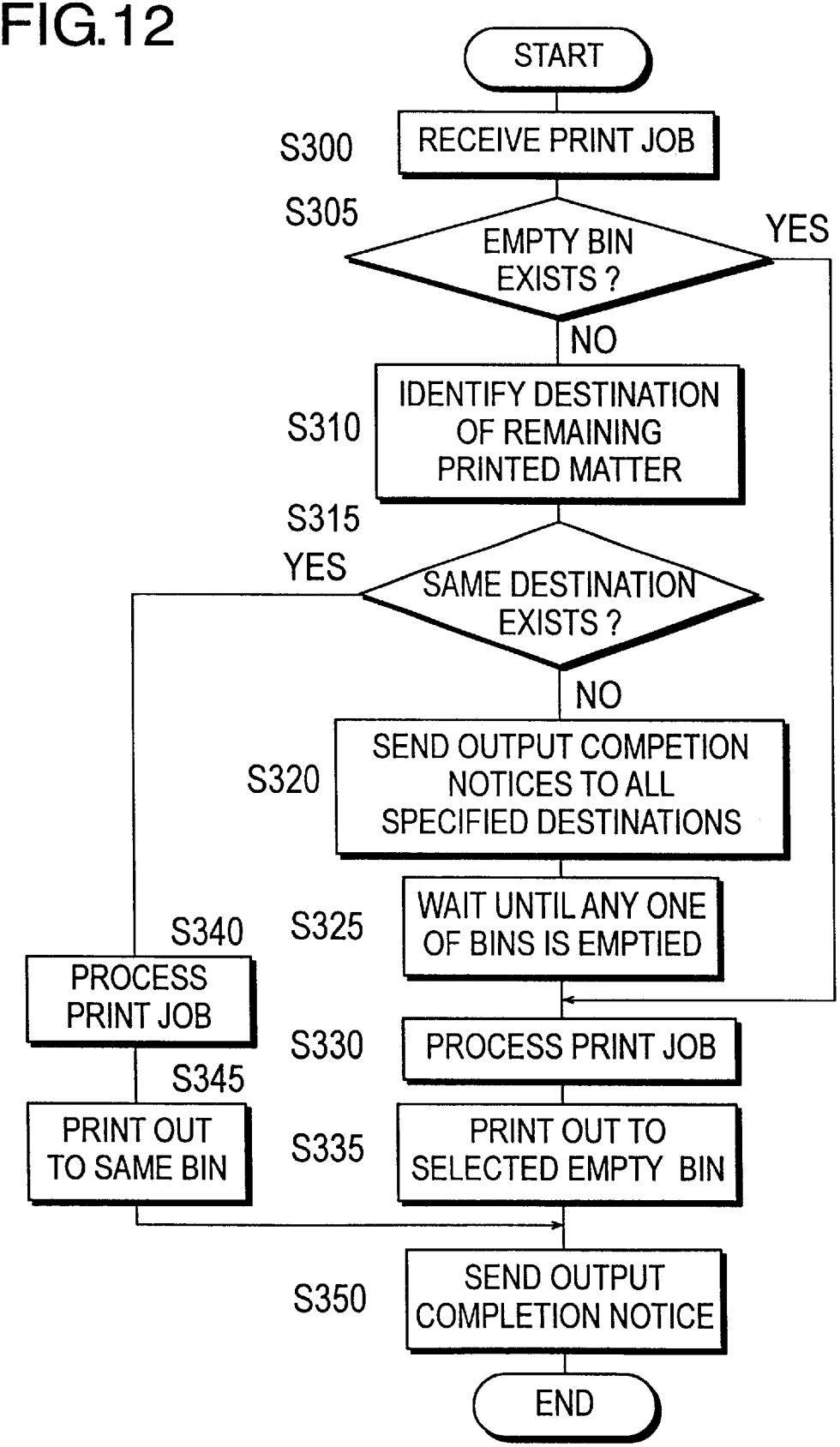
FIG. 12 is a control flowchart for describing the control operation of the printer corresponding to the fourth embodiment of the present invention.

Next, the control operation of the printer 10a corresponding to this embodiment will be described in accordance with the control flowchart shown in FIG. 12. FIG. 12 shows a series of procedures on the printer 10a in the first mode of the two modes described above, for receiving a print job addressed to a certain user (e.g., user A), processing the print job, and then sending an output completion notice to the user A who is the destination of the print job. Incidentally, the control flowchart shown in FIG. 12 is stored in the ROM of the memory 13a as a control program and is executed by the CPU 12.

Incidentally, the control flowchart for the second mode of the two modes mentioned above is basically the same with the control flowchart corresponding to the third embodiment shown in FIG. 10 except for a difference whether a bin of the discharge destination for the received print job is predetermined or can be arbitrarily determined by the printer 10a (only the contents of the step S205 differ), so that the explanation therefor will be omitted.

First, at the step S300, when the job receiving unit 11 receives a print job for a certain user (e.g., user A), the received print job is stored (accumulated) temporarily in the job storage unit 131 in the memory 13a.

Then, at the step S305, it makes a decision whether or not there exists any empty bin in which no printed matter remains, based on the detection result of the output removal detecting unit 17. As a result of this decision, if there exists any empty bin (S305:YES), it goes directly to the step S330, and if there exists no empty bin (S305:NO), it goes to the step S310.

At the step S310, it identifies the destination (user) of every printed matter remaining in any of all the bins 1–5, i.e., all the users the printed matter for whom is left remaining in any of the bins, looking up the user information table 133 in the memory 13a.

Then, at the step S315, it makes a decision whether or not there exists the same destination (user A) as that for the print job to be processed next (e.g. the print job received at the step S300), in all the destinations identified at the step S310. As a result of this decision, if there exists no same destination (user A) (S315:NO), it advances to the step S320, and if there exists the same destination (user A) (S315:YES), it advances to the step S340.

At the step S320, it sets all the destinations (all the users) identified at the step S310 as output completion notice destinations, and transmits to the output completion notice sending unit 16 a command to send output completion notices. On receiving this command, the output completion notice sending unit 16 sends output completion notices to all the destinations (all the users) identified at the step S310.

Then, at the step S325, it waits until the output removal detecting unit 17 detects the fact that the printed matter has been removed from any one of the bins, i.e., that any one of the bins is emptied (prohibition of the processing of the print job), and proceeds to the step S330 at a point of time when the fact that any one of the bins is emptied is detected. Consequently, the existence of the printed matter for multiple users in one bin in a mixed state can be prevented with certainty. As soon as it detects the fact that any one of the bins is emptied, it also deletes the user information on that bin from the user information table 133 in the memory 13a.

At the step S330, it processes, the print job to be processed next (e.g., the print job received at the step S300), and makes the printer engine 14 print.

Then, at the step S335, it selects one bin from the empty bins detected at the step S305 by any appropriate method to be described later, makes the resultant printed matter discharged to the empty bin thus selected, and proceeds to the step S350.

Here, in general, as a method of selecting one bin from multiple bins, i.e., a method of determining a bin to which the printer 10a is to output, any appropriate method (standard) may be used. For example, a bin can be selected simply in the order of the bin number, or in an ascending order of the number of user information stored in the bin, or in an ascending order of the total volume of print jobs in the bin.

On the other hand, at the step S340, it processes the print job concerned and makes the printer engine 14 print, as similar to the step S330.

Then, at the step S345, it selects a bin where the printed matter for the same destination (user A) remains (and, if there exists more than one such bin, further selects one bin from such multiple bins by any appropriate method mentioned above), makes the resultant printed matter discharged to the bin thus selected, and proceeds to the step S350.

At the step S350, it sets the destination (user A) of the print job processed at the step S330 or the step S340 as an output completion notice destination, and transmits to the output completion notice sending unit 16 a command to send an output completion notice on receiving this command, the output completion notice sending unit 16 sends the output completion notice to the set output completion notice destination, i.e., the destination (user A) of the print job concerned. The output completion notice at this time includes the identification information on the bin of the discharge destination (e.g., the bin number) in addition to the notice indicating that the output is completed, as mentioned above. Further, simultaneously with the transmission of the output completion notice, it writes information on the user of the output completion notice destination (user A) to the position of the bin which is selected as the bin of the discharge destination this time on the user information table 133 in the memory 13a.

Therefore, according to this embodiment, when, in such a state that the printed matter remains in all the bins 1–5 of the paper discharge unit 15 which is used as mail-bin, an attempt is made to process a print job for a certain user (user A), output completion notices are transmitted to all the users the printed matter for whom is left remaining, before the print job is processed and the output completion notice is transmitted to the user concerned (user A), so that it makes it possible to notify each user of the presence of the remaining printed matter to be picked up, thereby serving to prevent such a situation that printed matter for multiple users exists in one bin in a mixed state.

Incidentally, although for the procedures shown in the control flowchart of FIG. 12 various modifications can also be thought of, the contents therefor are essentially similar to those described in the third embodiment, so that the explanation therefor will be omitted.

However, in a case where it cancels a waiting state (prohibition of the processing of a print job) and starts to process a print job as soon as printed matter has been removed from a bin during a waiting period, regardless of the length of the set waiting time, according to the modification corresponding to the fourth embodiment, the printer 10a outputs to any bin if no printed matter has been removed from any of the bins although a prescribed time has passed.

When the method shown in the above-mentioned modification is applied to the examples of FIG. 11 and FIG. 13, it goes as follows.

Let us think about a case of receiving a print job for the user G in the example of FIG. 11. In this case, it retrieves the empty bin 2, outputs for the user G setting this bin 2 as a bin of the discharge destination, and then transmits the output completion notice (including the bin number 2 of the discharge destination) for the user G. Then, it writes information on the user G to the position of the bin 2 on the user information table 133.

Let us now think about a case of receiving a print job for the same user G in the example of FIG. 13. In this case, it tries to find an empty bin, but finds that there is no empty bin, and, moreover, the user G cannot be found in the users the printed matter for whom is left remaining, so that it transmits output completion notices to all the users the printed matter for whom is left remaining (users A, B, C, D, E, and F). It then outputs for the user G to any bin which is made empty (bin number N) and transmits the output completion notice (including the bin number N of the discharge destination) for the user G. Then, it writes information on the user G to the position of the bin N on the user information table 133.

Incidentally, when a computer is used in any of the above embodiments as mentioned above, the output completion notice sending technology according to the present invention is employed by executing with the CPU 12 the particular programs describing the procedures showing in FIGS. 5, 6, 10, and 12, and those programs can be provided by recording media which can be read by the computer (e.g., floppy disk, CD-ROM, etc.). The programs recorded on the computer readable recording media are generally transferred to and stored in a hard disk. Any of these programs can be offered as application software which executes the above-mentioned process by itself, or can be built into the software of the printer 10 or 10a as a feature of the printer 10 or 10a.

The computer program product specified in the claim of the invention includes the program itself, the recording media which store the program, and devices which operate with the program installed therein.

What is claimed is:

1. An image forming apparatus, comprising:
   a receiving unit for receiving a, print job;
   a storing unit for storing the received print job;
   multiple bins for receiving paper printed based on the stored print job, each of said multiple bins being assigned a specific user;
   a sending unit, after all of the paper printed based on the print job are discharged to a bin, for sending an output completion notice to a user corresponding to the bin to which the paper is discharged; and
   a control unit for inhibiting said sending unit from sending the output completion notice if, at the time when all of the paper printed based on the print job have been discharged to the bin, there exists in said storing unit an unprinted print job which designates as a destination the same user that the print job the output for which has been completed designates.

2. A method for controlling an image forming apparatus having multiple bins for receiving paper printed based on a print job, each of said multiple bins being assigned a specific user, and said apparatus being capable, after all of the paper printed based on the print job are discharged to a bin, of sending an output completion notice to a user corresponding to the bin to which the paper is discharged, said method comprising the steps of:
   receiving a print job;
   storing the received print job in a memory unit; and
   inhibiting the sending of the output completion notice if, at the time when all of the paper printed based on the print job have been discharged to the bin, there exists in said storing unit an unprinted print job which designates as a destination the same user that the print job the output for which has been completed designates.

3. A computer program in an image forming apparatus having multiple bins for receiving paper printed based on a print job, after all of the paper printed based on the print job are discharged to a bin, for sending an output completion notice to a user corresponding to the bin to which the paper is discharged, each of said multiple bins being assigned a specific user, said computer program executing the procedures of:
   receiving a print job;
   storing the received print job in a memory unit; and
   inhibiting the sending of the output completion notice if, at the time when all of the paper printed based on the print job have been discharged to the bin, there exists in said memory unit an unprinted print job which designates as a destination the same user that the print job the output for which has been completed designates.

4. An image forming apparatus, comprising:
   a receiving unit for receiving a print job;
   a storing unit for storing the received print job;
   multiple bins for receiving paper printed based on the stored print job, each of said multiple bins being assigned a specific user; and
   a sending unit, after all of the paper printed based on the print job are discharged to a bin, for sending an output completion notice to a user corresponding to the bin to which the paper is discharged,
   wherein said sending unit sends a first output completion notice if, at the time when all of the paper printed based on the print job have been discharged to the bin, there exists in said storing unit an unprinted print job which designates as a destination the same user that the print job the output for which has been completed designates, and sends a second output completion notice if, at the time when all of the paper printed based on the print job have been discharged to the bin, there exists in said storing unit no unprinted print job which designates as a destination the same user that the print job the output for which has been completed designates.

5. A method for controlling an image forming apparatus having multiple bins for receiving paper printed based on a print job, each of said multiple bins being assigned a specific user, and said apparatus being capable, after all of the paper printed based on the print job are discharged to a bin, of sending an output completion notice to a user corresponding to the bin to which the paper is discharged, said method comprising the steps of:

receiving a print job;

storing the received print job in a memory unit; and sending a first output completion notice if, at the time when all of the paper printed based on the print job have been discharged to the bin, there exists in said storing unit an unprinted print job which designates as a destination the same user that the print job the output for which has been completed designates, and sending a second output completion notice if, at the time when all of the paper printed based on the print job have been discharged to the bin, there exists in said storing unit no unprinted print job which designates as a destination the same user that the print job the output for which has been completed designates.

6. An image forming apparatus, comprising:

a receiving unit for receiving a print job;

a bin for receiving paper printed based on the received print job;

a detecting unit for detecting whether or not there is any paper in the bin;

a deciding unit for deciding whether or not, when there is paper in the bin, a destination of the paper existing in the bin is the same as a destination of the received print job; and a sending unit, if the destination of the paper existing in the bin is not the same as the destination of the received print job, for sending a warning to the destination of the paper existing in the bin.

7. An image forming apparatus of claim 6, wherein the number of said bin is multiple, further comprising a selecting unit for selecting one bin as a discharge destination of the paper from said multiple bins, and wherein said deciding unit makes such a decision when there is paper in the selected bin.

8. An image forming apparatus of claim 7, wherein at least one of said multiple bins is assigned a specific user, and wherein said selecting unit, concerning a print job which designates a user assigned to a bin as a destination, selects the bin corresponding to the user.

9. An image forming apparatus of claim 7, wherein none of said multiple bins are assigned a specific user, and wherein said selecting unit selects one bin by giving an empty bin preference.

10. An image forming apparatus of claim 6, further comprising a control unit, if the destination of the paper existing in the bin is not the same as the destination of the received print job, for inhibiting the processing of the print job until the bin becomes empty, and a second sending unit for sending an output completion notice to the destination of the print job processed.

11. An image forming apparatus of claim 6, further comprising a second deciding unit for deciding whether or not a prescribed time has passed since the warning was sent to the destination of the paper existing in the bin, a control unit, if the destination of the paper existing in the bin is not the same as the destination of the received print job, for inhibiting the processing of the print job until the bin becomes empty or the prescribed time has passed, and a second sending unit for sending an output completion notice to the destination of the print job processed.

12. A method for controlling an image forming apparatus having a bin for receiving paper printed based on a received print job, said method comprising the steps of:

receiving a print job;

detecting whether or not there is any paper in the bin;

deciding whether or not, when there is paper in the bin, a destination of the paper existing in the bin is the same as a destination of the received print job; and sending, if the destination of the paper existing in the bin is not the same as the destination of the received print job, a warning to the destination of the paper existing in the bin.

13. A computer program in an image forming apparatus having a bin for receiving paper printed based on a received print job, said computer program executing the procedures of:

receiving a print job;

detecting whether or not there is any paper in the bin;

deciding whether or not, when there is paper in the bin, a destination of the paper existing in the bin is the same as a destination of the received print job; and sending, if the destination of the paper existing in the bin is not the same as the destination of the received print job, a warning to the destination of the paper existing in the bin.

14. An image forming apparatus, comprising:

a receiving unit for receiving a print job;

multiple bins for receiving paper printed based on the received print job, each of said multiple bins being assigned a specific user;

a detecting unit for detecting whether or not there is any paper in each bin;

a deciding unit for deciding whether or not, when there is paper in every bin, the destination of the paper existing in each bin is the same as the destination of the received print job; and a sending unit, if the destination of the paper existing in each bin is not the same as the destination of the received print job, for sending a warning to the destination of the paper existing in each bin.

15. An image forming apparatus of claim 14, further comprising a selecting unit for selecting one bin as a discharge destination of the paper by giving an empty bin of said multiple bins preference.

16. An image forming apparatus of claim 14, further comprising a control unit, if the destination of the paper existing in each bin is not the same as the destination of the received print job, for inhibiting the processing of the print job until at least one of said multiple bins becomes empty, and a second sending unit for sending an output completion notice to the destination of the print job processed.

17. An image forming apparatus of claim 14, further comprising a second deciding unit for deciding whether or not a prescribed time has passed since the warning was sent to the destination of the paper existing in each bin, a control unit, if the destination of the paper existing in each bin is not the same as the destination of the received print job, for inhibiting the processing of the print job until at least one of said multiple bins becomes empty or the prescribed time has passed, and a second sending unit for sending an output completion notice to the destination of the print job processed.

18. A method for controlling an image forming apparatus having multiple bins for receiving paper printed based on a received print job, each of said multiple bins being assigned a specific user, said method comprising the steps of:

receiving a print job;

detecting whether or not there is any paper in each bin;

deciding whether or not, when there is paper in every bin, a destination of the paper existing in each bin is the same as a destination of the received print job; and sending, if the destination of the paper existing in each bin is not the same as the destination of the received print job, a warning to the destination of the paper existing in each bin.

* * * * *